(No Model.)

A. SIMON.
NUT LOCK.

No. 432,572. Patented July 22, 1890.

WITNESSES:
A. Ruppert
G. B. Towles

INVENTOR
Adam Simon
BY Thomas P. Simpson
ATTORNEY.

UNITED STATES PATENT OFFICE.

ADAM SIMON, OF PITTSBURG, PENNSYLVANIA.

NUT-LOCK.

SPECIFICATION forming part of Letters Patent No. 432,572, dated July 22, 1890.

Application filed October 29, 1889. Serial No. 328,540. (No model.)

*To all whom it may concern:*

Be it known that I, ADAM SIMON, a citizen of the United States, residing at Pittsburg, in the county of Allegheny and State of Pennsylvania, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to means by which nuts may be prevented from turning on bolts, and after being described in connection with the drawings will be pointed out in the claims.

Figure 1:
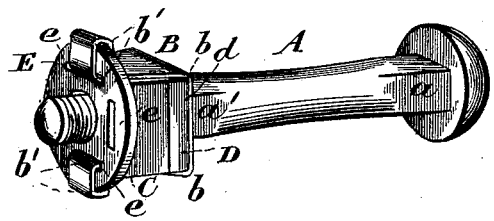
Figure 2:
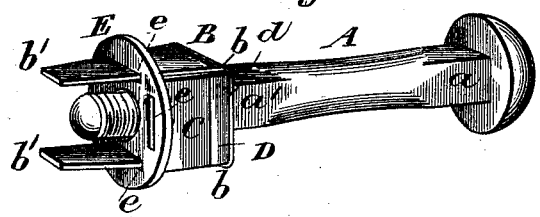
Figure 3:
Figure 4:
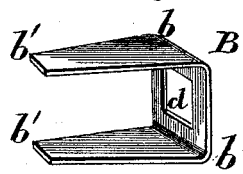

Figure 1 of the drawings is an elevation in perspective of a nut locked on a bolt by my invention; Fig. 2, a similar view before the plate has been turned over the cap; Fig. 3, a detail view of the bolt, and Fig. 4 a detail view of the metallic plate.

In the drawings, A represents the bolt squared at $a$ and $a'$, the latter being next to the thread $a^2$. Any irregular form in cross-section, instead of a square, may be employed for the same purpose of either preventing the bolt itself from turning or preventing the plate B from turning on the bolt. This plate is preferably made of metal, like copper, which is not frangible or liable to crack in bending.

C is an ordinary nut, which is intended to work on the thread $a^2$, and D a washer with a central square hole to fit on the square $a'$ of the bolt.

E is a cap with slots $e$ to receive the ends of the plate B, which is first placed on the bolt and followed by the washer. Then the nut is screwed "home" and the plate B given two right-angled bends at $bb$. The ends $b'$ $b'$ are now inserted in the holes $e$ $e$ of the cap E and bent over as well as under said cap. By this means neither bolt nor nut can turn, no matter to what jarring or shaking they may be subjected.

I am aware that a top plate has been made with a central square hole to fit on the squared end of screw for the purpose of preventing the subjacent washer-plate, which is bent up the sides of nut and passed through holes of top plate, from turning; but

What I claim as new, and desire to protect by Letters Patent, is—

1. A nut-lock in which the bolt is squared at $a'$ contiguous to the under side of its thread and combined with a turn-up plate B and washer D, both having a square hole in the middle, whereby said washer and plate are locked at the middle, as and for the purpose described.

2. The slotted cap-plate E, combined with a turn-up plate, locked at the middle, passing up through said cap-plate with its ends, and said ends turned outwardly on, around, and under the said cap-plate, whereby said cap-plate is held tightly and squarely down on the nut.

In testimony whereof I affix my signature in presence of two witnesses.

ADAM SIMON.

Witnesses:
J. N. JARRETT,
A. RUPPERT.